United States Patent [19]

Hirsbrunner et al.

[11] 4,293,581

[45] Oct. 6, 1981

[54] SAPONIFICATION TREATMENT OF SPENT COFFEE GROUNDS

[75] Inventors: Pierre Hirsbrunner, Corseaux; Raymond Bertholet, La Tour-de-Peilz, both of Switzerland

[73] Assignee: Societe d'Assistance Technique Pour Produits Nestle S.A., Lausanne, Switzerland

[21] Appl. No.: 216,960

[22] Filed: Dec. 16, 1980

Related U.S. Application Data

[63] Continuation-in-part of Ser. No. 90,148, Nov. 1, 1979, abandoned.

[30] Foreign Application Priority Data

Nov. 3, 1978 [CH] Switzerland .................... 11332/78

[51] Int. Cl.³ .............................................. A23K 1/14
[52] U.S. Cl. .................................... 426/630; 426/807
[58] Field of Search .............................. 426/630, 807

[56] References Cited

PUBLICATIONS

Coffee Dregs as a Food for Stock, International Review of the Science and Practice of Agriculture, vol. 10, 1919, p. 197.
Chemical Abstracts, vol. 82, 1975 96689y.

*Primary Examiner*—Joseph M. Golian
*Attorney, Agent, or Firm*—Vogt and O'Donnell

[57] ABSTRACT

An animal feed component is prepared by subjecting spent coffee grounds to a saponification treatment in an aqueous reaction medium, acidifying the medium to a pH below 5 and recovering an animal feed component by drying the acidified medium.

The grounds may optionally be subjected to an oxidation treatment after saponification.

9 Claims, No Drawings

SAPONIFICATION TREATMENT OF SPENT COFFEE GROUNDS

This application is a continuation-in-part of our co-pending application Ser. No. 090,148 filed Nov. 1, 1979 and now abandoned.

This invention is concerned with a process for producing an animal feed component from spent coffee grounds.

Spent coffee grounds are the residue obtained after treatment of coffee with hot water or steam for extracting soluble solids and aromatic substances therefrom. After drainage, they generally contain around 18 to 30% of dry matter. Substantial quantities are available as a by-product of the instant coffee industry, where they are frequently used as fuel in boilers or coffee roasters.

The grounds contain significant quantities of coffee oil but the usual processes for extracting this oil, by pressing or hexane extraction, do not lead to total de-oiling. In general, 18 to 20% of oil are retained, based on the weight of dry matter.

It is not always efficient to simply burn such a by-product which contains fats, is relatively rich in nitrogenous substances and of which the value expressed in starch equivalents is comparable to that of a cereal such as barley. There has therefore been a recent movement towards utilizing spent grounds in animal feeding, as is described for example in Ind. Alim. et Agric. 5, 543 (1975). There is nevertheless a dosage problem and in practice spent grounds are only added to the diet in minor proportions in sustained feeding for long periods or, when used alone or in preponderant amounts, only for short periods of time. These restrictions are not attributable to the grounds themselves, but to the residual oil which they contain. Thus, this oil contains non-glycerides, inter alia diterpene esters, in particular cafestol and kahweol esters, of which the innocuity at high doses over long periods of time has not been confirmed.

According to the present invention, a process for producing an animal feed component is provided which comprises subjecting spent coffee grounds to a saponification treatment in an aqueous reaction medium, acidifying the medium to a pH below 5 and recovering an animal feed component by drying the acidified medium.

Needless to say, the saponification treatment does not act, strictly speaking, on the grounds but rather on the oil they contain. This type of treatment is in itself known and traditional in soapmaking. It simply consists of heating the material to be treated with a strongly alkaline aqueous medium, especially barium, calcium, potassium or sodium hydroxide, the pH being above 8. To avoid the need for excessively large quantities of acid during the subsequent acidification, the saponification is advantageously carried out at a pH between 8 and 13, preferably 9 to 10.5. As high a temperature as possible is selected, for example between 90° and 100° C. Under these conditions the contact time is normally of the order of ½ to 2 hours. If the grounds are very dry, a little water or liquid medium may be added to improve contact between the grounds and the strong alkali.

The effect of acidification is to decompose the cafestol and the kahweol (hereafter simply referred to as "cafestol") freed from their esters by saponification. To achieve this, the medium should be sufficiently acid, that is have a pH below 5 and preferably between 3 and 5. Any edible acid may be used, for example hydrochloric acid, sulphuric acid, phosphoric acid, acetic acid, citric acid, lactic acid or malic acid. The grounds are then dried using any suitable equipment such as a rotary kiln or drying tower.

In one embodiment of the process according to the invention, the grounds are subjected to an additional oxidation treatment. Here again it is not the grounds themselves which are affected by oxidation but rather the lipids they contain.

Oxidation may be effected, for example, by adding hydrogen peroxide to the reaction medium, either before or after acidification, the medium being maintained at around 90° to 100° C. Advantageously, the hydrogen peroxide is allowed to react for ½ to 3 hours.

Alternatively oxygen or air may be injected into the reaction medium after acidification or blown through the grounds, either after or during drying. The total time varies with the temperature of the gas injected and, for air, may be between 1 and 3 hours at temperatures of the order of 110° to 160° C. Preferably air is injected at a temperature of 130° to 160° C. during 1 to 2 hours.

The spent grounds used as starting material generally contain, on a dry matter basis, from 1 to 5% of cafestol in the form of diterpene esters. The grounds treated in accordance with the invention have a cafestol content which has been lowered to below 0.5% to 1.3% (depending on the initial content) on dry grounds, and down to below 0.1% if the additional oxidation treatment has been applied.

As a result of the treatment, the amount of water-soluble material (and ash) in the grounds increases substantially, whereas the composition of the "fatty" component is considerably modified. Thus, in untreated grounds it is made up mainly (about 75%) of triglycerides; the saponification treatment decomposes the triglycerides so that free fatty acids (or salts of free fatty acids) are the principal constituents.

The grounds are thus particularly suitable in animal feeding, for example for ruminants, pigs and goats.

The process according to the invention is illustrated by the following examples, in which the percentages are given on a weight basis.

EXAMPLE 1

120 g of Ca(OH)$_2$ are added to 10 kg of spent coffee grounds (70% Robusta + 30% Arabica) containing 18% dry matter and 1.2% of cafestol on dry matter (in the form of diterpene esters) and the mixture is heated at 98° C. for 1 hour in a ribbon blender. The pH of the suspension is 10.5. 185 g of H$_3$PO$_4$ are then added to bring the pH to 3.5. After drying at 100° C. for 3¼ hours grounds containing 5% moisture and only 0.5% of free cafestol on dry matter are obtained.

The compositions of the dry matter is saponified grounds obtained in accordance with this Example, and of the untreated starting grounds, are shown below:

|  | Saponified | Untreated |
|---|---|---|
| Aqueous extract (1) | 9.8% | 0.1% |
| Ether extract (2) (3) | 17.2% | 27.0% |
| Ash | 14.9% | 1.15% |
|  | of which Ca = 5%, P = 1.6% | of which Ca = 0.27% |

(1) The aqueous extract (determined by Soxhlet extraction) reflects the total amount of water-soluble materials; as would be expected it is insignificant is regular -continued spent coffee grounds.
(2) Determined by AOAC method 7.045 (1975); it is a measure of the "fatty" component.
(3) The compositions of the ether extracts, in percentages, are:

|  | Saponified | Untreated |
|---|---|---|
| Triglycerides | 0 | 15 |
| Free fatty acids | 82** | 0 |
| Terpene esters | 0 | 20* |
| Terpenes | 13*** | 0 |
| Steroids | 5 | 5 |

*principally esters of cafestol and kahweol
**principally linoleic; the free fatty acid content may be modified by neutralization, producing ether insoluble fatty acid salts (soaps)
***degradation products of the terpene esters.

EXAMPLE 2

1.1 kg of NaOH are added to 50 kg of spent coffee grounds (African Arabica) containing 24% dry matter and 3.8% of cafestol on dry matter (in the form of diterpene esters) and the mixture is heated at 97° C. for 1 hour. The pH is 10.2. It is then acidified to pH 4.5 by adding 1.4 kg of concentrated $H_2SO_4$, and dried by circulating air for 2 hours. The dried grounds contain 21% moisture and only 1.25% of free cafestol on dry matter.

EXAMPLE 3

The procedure of Example 2 is repeated, but a corresponding quantity of KOH is used instead of NaOH. The grounds thus obtained are comparable to those of Example 2.

EXAMPLE 4

The procedure is as described in Example 1 but the dried grounds are charged into a Lödige mixer and heated to 150° C. Air is blown in for 1¼ hours. The resulting grounds contain only 1.5% of moisture and only 0.1% of residual free cafestol on dry matter.

EXAMPLE 5

Dried grounds obtained as described in Example 2 are fed into a Lödige mixer which is pre-heated to 135° C. Air is injected for 2 hours. The spent coffee grounds thus obtained contain only 0.4% of residual free cafestol on dry matter.

EXAMPLE 6

The procedure is as described in Example 1 except that before neutralization with phosphoric acid 30-volume hydrogen peroxide is added to the mixture in an amount corresponding to 18% dry matter. The reaction is then allowed to proceed for 1 hour at 100° C. and after acidification the grounds are dried for 2½ hours at 100° C. The dried grounds contain only 0.13% of free cafestol on dry matter.

We claim:

1. Process for producing an animal feed component which comprises subjecting spent coffee grounds to a saponification treatment in an aqueous reaction medium which effectively saponifies cafestol and kahweol esters contained therein, acidifying the medium to a pH below 5 and recovering an animal feed component by drying the acidified medium.

2. Process according to claim 1, in which that the saponification is carried out at a pH between 8 and 13.

3. Process according to claim 1 or claim 2, in which the saponification is carried out at a temperature between 90° and 100° C.

4. Process according to claim 1 or claim 2, in which that the saponification is carried out during ½ to 2 hours.

5. Process according to claim 1, in which after saponification the grounds are subjected to an oxidation treatment.

6. Process according to claim 5, in which the oxidation treatment is effected with hydrogen peroxide at a temperature of 90° to 100° C. for ½ to 3 hours.

7. Process according to claim 5, in which the oxidation treatment is effected with air at a temperature between 110° and 160° C.

8. Process according to claim 1 or claim 2, in which the medium is acidified with an edible acid to a pH of 3 to 5.

9. An animal feed component prepared by the process according to claim 1.

* * * * *

UNITED STATES PATENT AND TRADEMARK OFFICE
CERTIFICATE OF CORRECTION

PATENT NO. : 4,293,581
DATED : October 6, 1981
INVENTOR(S) : Pierre Hirsbrunner and Raymond Bertholet It is certified that error appears in the above—identified patent and that said Letters Patent is hereby corrected as shown below:

Column 2, line 68, "it is insignificant is" should read --it is insignificant in--.

Column 4, line 2 of Claim 4, delete "that".

Signed and Sealed this

Fifth Day of January 1982

[SEAL]

Attest:

Attesting Officer

GERALD J. MOSSINGHOFF
Commissioner of Patents and Trademarks